United States Patent [19]

Nusbaum et al.

[11] Patent Number: 4,840,604

[45] Date of Patent: Jun. 20, 1989

[54] MASTER SAFETY SHIELD WITH DEFLECTING DOOR

[75] Inventors: David B. Nusbaum, Shell Rock; Robert L. Mayfield, Waterloo, both of Iowa

[73] Assignee: Deere & Company, Moline, Ill.

[21] Appl. No.: 198,885

[22] Filed: May 26, 1988

[51] Int. Cl.⁴ ............................................... F16D 3/84
[52] U.S. Cl. ...................................... 464/176; 74/609
[58] Field of Search .................. 74/608, 609; 464/170, 464/171, 176

[56] References Cited

U.S. PATENT DOCUMENTS 4,665,768 5/1987 Rashkovsky ........................... 74/609
4,761,152 8/1988 Wagenbach, Jr. ................... 464/176

Primary Examiner—Daniel P. Stodola

[57] ABSTRACT

A PTO master safety shield is provided having a cut-out in the upper surface thereof. A door is pivotally mounted within the shield to close the door and biased by springs into the closed position. If the center link of a 3-point hitch is lowered to where it contacts the lip of the door, it will simply press the door downwards. Upon subsequent lifting of the center link, the springs will move the door back into the normal position. The main body of the master field also is pivotally mounted to flip up to a raised position. The door is provided with arms which engage slots at the back of the master shield. If the master shield is left in the raised position and the center link is lowered to where it contacts the door, the door will pivot, the arms of the door will lift the back end of the master safety shield and force it forward until it falls down into its normal position.

17 Claims, 4 Drawing Sheets

MASTER SAFETY SHIELD WITH DEFLECTING DOOR

BACKGROUND OF THE INVENTION

1. Field of the Invention

The present invention relates to safety devices, and particularly to master shields for power take-off shafts such as those mounted at the back of an agricultural vehicle with a 3-point hitch.

2. Description of the Related Art

Work vehicles such as agricultural and industrial tractors frequently have a power take-off shaft (PTO) extending therefrom to provide power to implements or other devices outside the vehicle. These PTO shafts typically rotate at hundreds of revolutions per minute and can be quite dangerous if left exposed. It therefore has become the nearly universal practice to provide a U-shaped shield around the PTO shaft, e.g., as shown in U.S. Pat. No. 2,443,035 (Hardy). The shield cannot be too close to the PTO shaft, since it also is common practice to provide shielding around the shaft being driven by the PTO, e.g., as taught in U.S. Pat. No. 3,462,975 (Skromme et al.), and adequate space must be provided within the U-shaped master shield for the implement shielding.

One effect of having a master shield over the PTO is that it may increase the difficulty of linking an implement drive shaft to the PTO. An early response to this situation was simple to make the PTO shield detachable, e.g., as taught in U.S. Pat. No. 3,389,763 (Meinert). However, some people have detached the safety shield and simply left it off, leaving an unprotected PTO. Pivotally mounted master safety shields then were developed, e.g., as taught in U.S. Pat. No. Re. 30,152 (Davis).

This flip-up shield also has certain disadvantages, however. Many work vehicles are provided with a 3-point hitch positioned around the PTO shaft. The center link of the 3-point hitch typically is positioned directly above the PTO master shield. If the hitch is lowered too far, the center link may hit and damage the PTO master shield. U.S. Pat. No. 4,553,950 (TEICH) teaches a PTO master shield designed to reduce this possibility by pivoting not only up from a stable position, but down as well.

Even this design still has the disadvantage that it depends upon the operator for proper function. The operator may neglect to put the safety shield down before lowering the center link, in which case the center link will still hit and damage the master shield. If the shield never gets repaired or replaced, the vehicle again is operating without the benefit of a proper PTO master safety shield.

In addition, the operator might flip the PTO shield up while connecting the PTO, and then neglect to put it back in its proper position before operating the machine. The center link then is very likely to hit the master shield, again damaging it.

SUMMARY OF THE INVENTION

It is the purpose of the present invention to provide a PTO master shield which can be forced downwards by the center link without damaging the shield, while at the same time providing proper shielding of the PTO. It is a further purpose of the present invention to provide a master shield which can be pressed by the center link into its normal operating position from its raised access position.

These purposes are accomplished according to the present invention by providing a PTO master shield which has a pivotally mounted spring-biased central door in the top thereof. If the center link is lowered too far when the PTO shield is in its normal operational position, the door will simply be pushed down by the center link. Upon raising the center link, the spring biasing of the door will lift the door back upwards into its normal position.

The door also can be used to force the main body of the master shield into its normal operational position if the center link presses against it when the main body is in its raised position. The main body of the master shield is slidably pivoted on pivot pins by slots formed in the master shield. The door is non-slidably pivoted about the same pivot pins. The door also has an extension thereon which can engage the top of the master shield when the master shield is in the raised position, but normally will not engage the master shield when it is in the lower, normal position.

In the raised position, the master shield rests on the pivot pin at one end of the slot, which is a stable position. In this position, the extension from the door will engage the master shield. If the door then is pressed upon by the center link, it will pivot about the pivot pin and the extension will lift the master shield up, in effect moving the pivot point of the master shield along the slot. Eventually, the pivot pin will reach the other end of the slot, which is on the opposite side of the center of gravity of the master shield. Gravity and the spring biasing the center door then will combine to force the master shield down into its normal position. Further downward movement of the center link then can move the center door downwards, as already described, if necessary.

As will be apparent, the present invention provides a PTO shield which will not be damaged by lowering of the center link, regardless of the position in which the operator has left the PTO master shield.

DETAILED DESCRIPTION OF THE PREFERRED EMBODIMENTS

Figure 1:
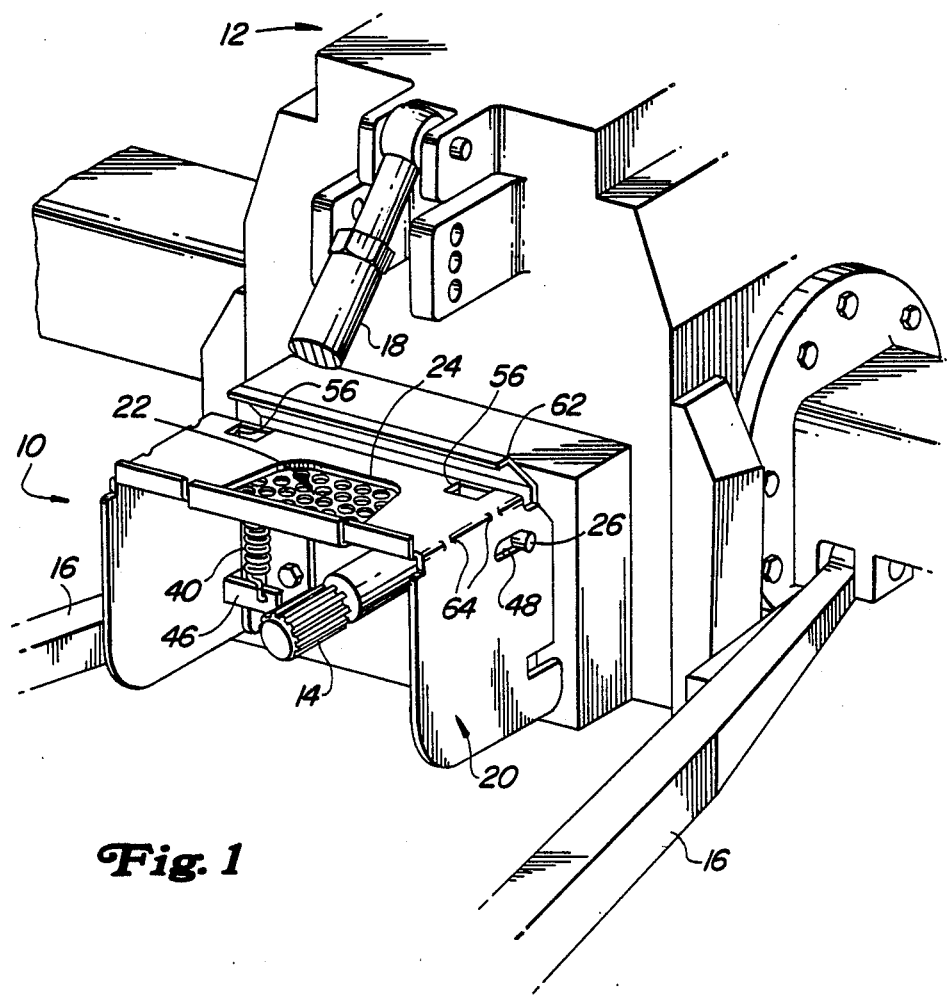
FIG. 1 is a perspective view of the PTO master safety shield according to the present invention mounted at the rear end of an work vehicle.

A PTO master safety shield 10 is shown in FIG. 1 mounted to the rear end of a tractor 12 about a PTO shaft 14. The tractor 12 has a 3-point hitch (shown only partially) disposed about the shield 10, including two draft links 16 and a center link 18.

Figure 2:
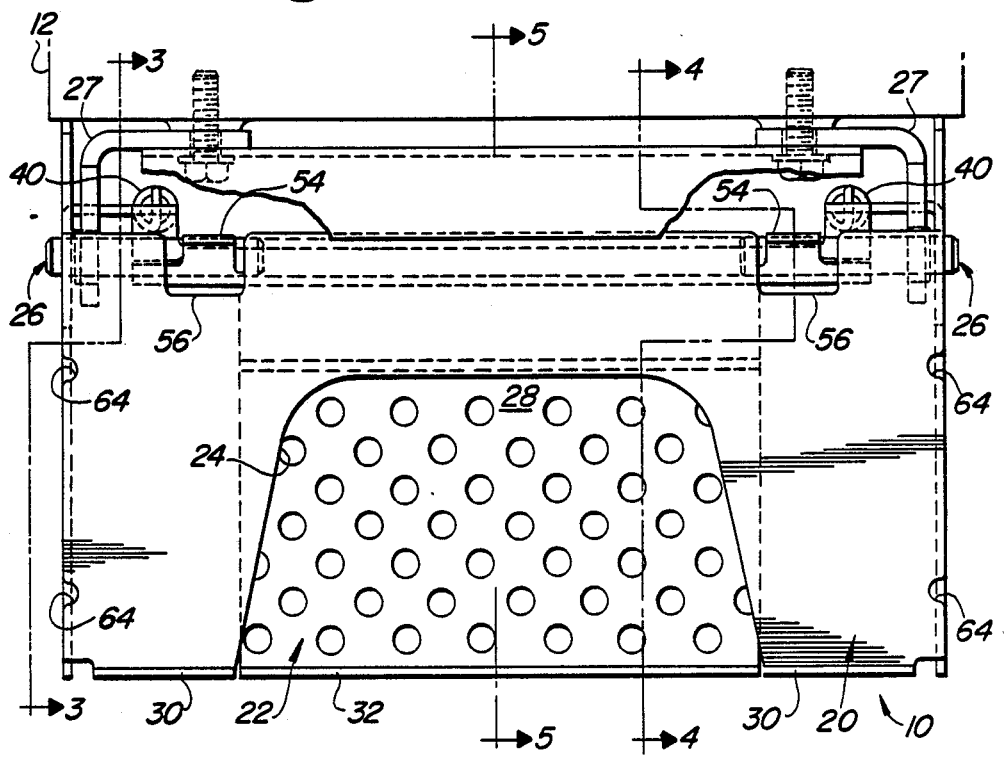
FIG. 2 is a top view of the PTO master shield shown in FIG. 1 in its normal position.

As shown in FIGS. 1 and 2, the PTO shield 10 according to the present invention has two major portions, namely the main body 20 and the center door 22. The door 22 closes a cut-out portion 24 of the main body 20. As will be discussed below, the door 22 is biased upwardly, so that the door 22 normally will close off the cut-out 24 of the main body 20.

Figure 3:
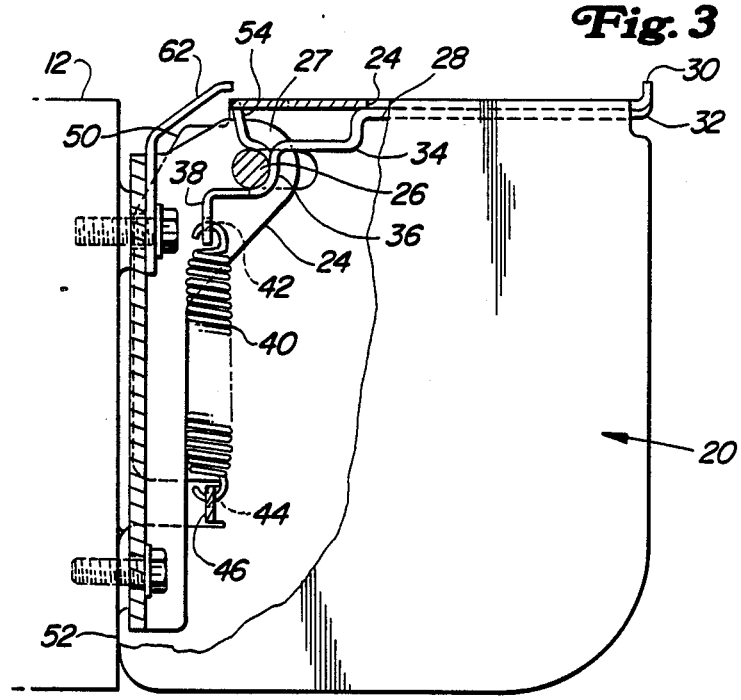
FIG. 3 is a top view of the PTO master shield taken along line 3—3 in FIG. 1, in its normal operational position.

Turning to FIGS. 2 and 3, the side of the main body 20 is substantially rectangular, though the corners preferably are rounded for safety. The center door 22 and main body 20 both are pivoted about pivot pins 26, which are mounted to the tractor body by brackets 27. Preferably, two pivot pins 26 are provided, one on each side of the PTO master shield 10. Alternatively, a single rod 26' may be used extending between the two sides, as shown in FIG. 6.

The center door 22 has a main door portion 28 which in the normal position closes the cut-out portion 24 of the main body 20. Preferably, both the main body 20 and the door 22 are provided with lips 30, 32 at their outer ends. The door 22 also has a spacing portion 34 which connects the main door portion 28 with the portions 36 of the door which are actually pivoted about the pivot pins 26. The door spacing portions 34 are properly shaped to ensure that the main door portion 28 will be pressed against the upper surface of the main body 20, regardless of the spacing of the pivot pin 26 from that surface.

Figure 6:
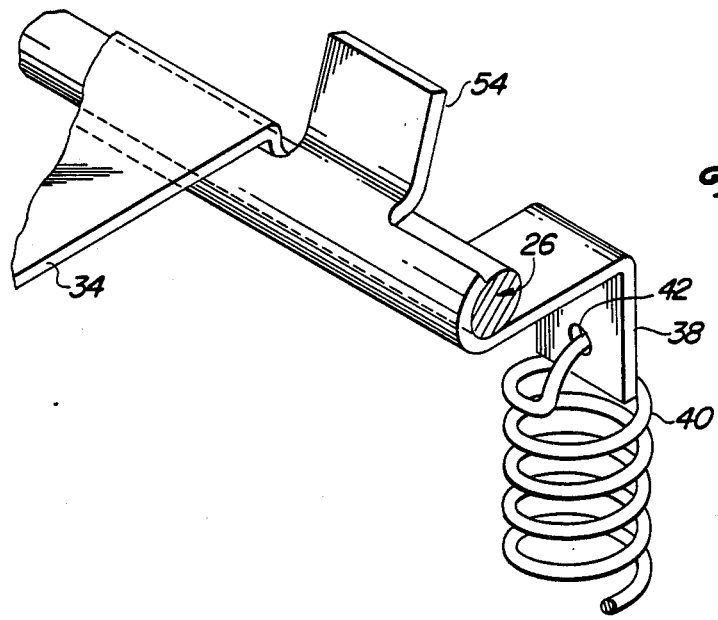
FIG. 6 is a detail of the various extensions of the center door of the PTO master shield shown in FIG. 1.

Each side of the center door 22 also has a spring extension 38 on the opposite side of the pivot pin 26 from the spacing portion 34, as best seen in FIGS. 3 and 6. One end of an extension spring 40 is hooked into a hole 42 in this spring extension 38. The other end of the spring 40 is hooked into a hole 44 in a spring flange 46 bent in from the proximal side of the main body 20. The flange 46 itself is best seen in FIG. 1. The springs 40 normally will serve to bias the main door portion 28 of the door 22 against the upper surface of the main body 20 of the safety shield 10, thereby closing the cut-out portion 24.

Figure 4:
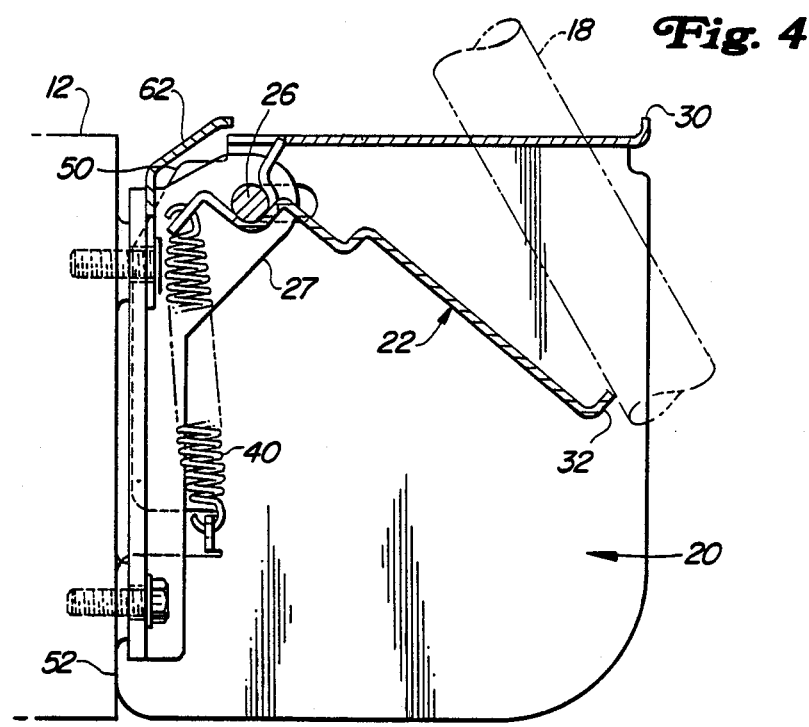
FIG. 4 is a cross-sectional view of the PTO master shield taken along 4—4 in FIG. 1, with the center door forced down by the center link of a 3-point hitch.

Turning to FIG. 4, if the center link 18 is lowered too far, it will press against the lip 32 of the door 22. The width of the door 22 and cut-out 24 are designed such that even at maximum sway in the horizontal direction, the center link 18 will engage only the door 22. Upon such engagement and further lowering of the center link 18, the door 22 will be pressed downwards, causing it to pivot about pivot pins 26 and extend springs 40. Upon subsequent raising of the center link 18, the springs 40 will contract, lifting the door back into the normal position shown in FIG. 3. As may be seen, this lowering of the center link 18 causes no damage to the shield 10.

Figure 5:
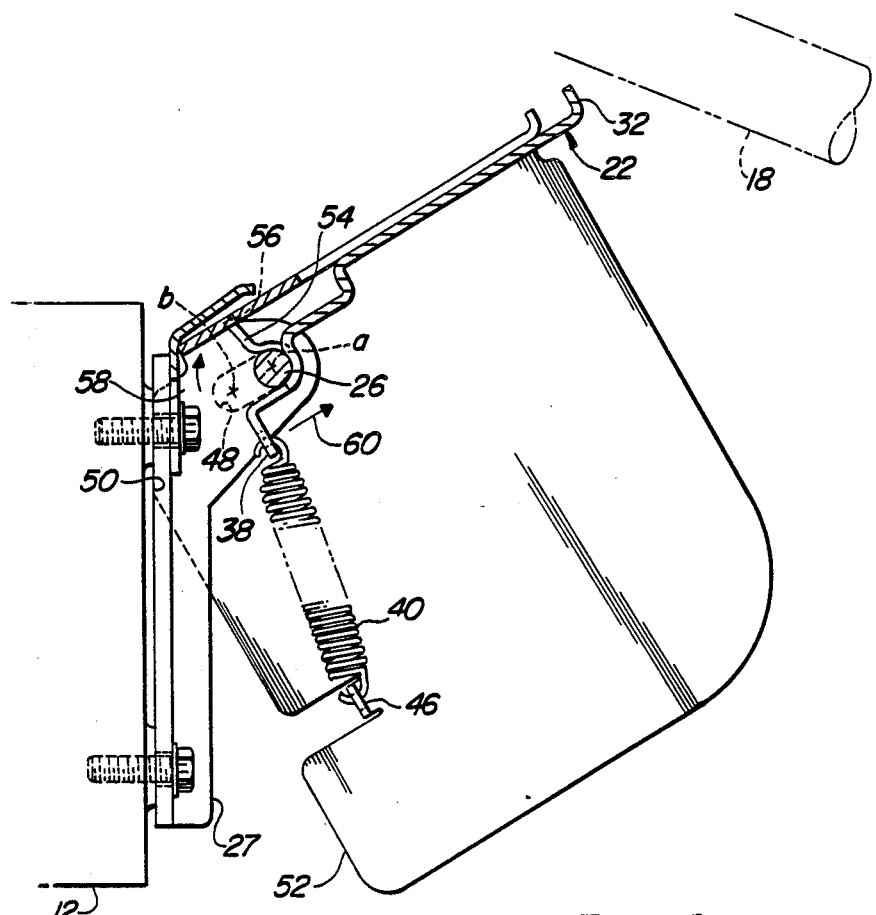
FIG. 5 is a cross-sectional view of the PTO master shield taken along line 5—5, with the shield in its raised position.

Referring to FIG. 5, to provide access to the PTO shaft 14 during coupling and uncoupling thereto, the master safety shield 10 is pivotal upwards about the pivot pins 26. A stable raised position for the safety shield is provided by use of pivot slots 48 in the sides of the main body 20 and cut-off portions 50 at the upper proximal corners of the main body 20. In particular, the main body 20 is mounted on the pivot pins 26 by the pivot slots 48. The slot length and position relative to the pivot pins 26, door spring extensions 38, springs 40 and spring flanges is such that when the pivot pins 26 are at one end of the slots 48, the pivot point a is on one side of the springs 40, while if they are positioned at the other end of the slots, the pivot point b is on the other side of the springs 40. The result is that the springs 40 pass over center as the main body 20 is shifted to move the pivot pins 26 to one end or the other of the slots 48, which in turn means that the ends of the slots 48 are stable positions. The cut-offs 50 on the main body 20 thus serve to stabilize the PTO shield 10 by resting against the tractor body 12 when the shield 10 is in the raised position shown in the figure with the pivot pins 26 at pivot point a. In contrast, the stable position when the pivot pins 26 are at pivot point b is with the edges 52 of the main body 20 resting against the tractor body 12, as shown in FIGS. 3 and 4.

The center door 22 also can be used to move the PTO shield 10 down into its normal position upon contact with the center link 18 if the operator leaves the shield 10 in the raised position shown in FIG. 5. The door 22 is provided with lift arms 54 on each side thereof which can engage lift slots 56 formed in the upper surface of the main body 20 of the PTO shield, as best seen in FIGS. 2 and 6. Returning to FIG. 5, when the center link 18 presses down on the lip 32 of the door 22, it will pivot around the pivot pins 26. As it does so, the arms 54 will move in the direction indicated by the arrow 58 and press against the edge of the lift slots 56. This in turn will lift the main body 20 in the direction indicated by the arrow 60, which will move the pivot slots 48 so that the pivot pins 26 are somewhere between points a and b. As this process continues, the pivot slots 48 eventually will be shifted so that the pivot pins 26 are moved all the way over to the pivot point b. The main body 20 then will be pulled by gravity and the springs 40 downwards into the normal position shown in FIG. 3. If the center link 18 continues moving downwards, it then will engage the door 22 and will press it down, as described in connection with FIG. 4.

Various additional features also preferably are provided. A guard piece 62 preferably is provided at the rear of main body 20 to cover any openings at the back of the shield. The guard 62 preferably is bent upwards slightly to allow pivoting of the shield 10 into the upper position shown in FIG. 5. As best seen in FIGS. 1 and 2, reinforcing ribs 64 also preferably are provided at the corners of the main body 20 to prevent collapse thereof. While PTO shields normally are not intended as a step and it normally is not advisable to use them as such, operators nevertheless may occasionally use them as a step. Accordingly, it also is advisable to perforate or otherwise distinguish the center door portion 28 of the door 22 and provide warnings to discourage stepping on the door 22.

Various modifications to the invention will be readily apparent to one or ordinary skill in the art. Accordingly, it is intended that the invention be limited only by the following claims.

We claim:

1. A master safety shield for a power take-off shaft, comprising:
   a U-shaped main body disposed above and around the power take-off shaft and having an opening in the central portion of the top thereof;
   a pivotally mounted door for closing said opening and having a first position closing said opening and a second position spaced away therefrom; and
   biasing means extending between said main body and said door for biasing said door into said first position.

2. The master shield of claim 1, wherein said door is pivotally mounted about at least one pivot pin and said main body also is pivotally mounted about said at least one pin.

3. The master shield of claim 2, wherein said main body has slots formed in the sides thereof and said at least one pivot pin extends into said slots to pivotally mount said main body.

4. The master shield of claim 3, wherein said biasing means comprises:
an extension connected to said door and extending to an opposite side of the pivot point of said door;
a spring flange formed on a side of said main body; and
a tension spring interconnecting said door extension and said spring flange.

5. The master shield of claim 4, wherein the opposite ends of said slots are on opposite sides of a line drawn between the connection points of said spring to said door extension and said spring flange.

6. The master shield of claim 5, wherein said main body has a normal position and a raised position, and has at least one lift slot formed in an upper surface thereof, and wherein said door has at least one lift arm extending therefrom and engageable with said at least one lift slot such that said lift arm can press against an end of said lift slot to move said main body from said raised position towards said normal position.

7. The master shield of claim 6, wherein upon lifting of said master shield by said lift arm when said master shield is in said raised position, said slot is moved so that said pivot pin is shifted in position from one end of said slot towards the opposite end thereof.

8. The master shield of claim 1, wherein the portion of said door within said opening in said main body is perforated.

9. A power take-off shaft master shield of the type having a pivotally mounted substantially U-shaped body, characterized in that:
the upper surface of the body has an opening formed therein;
a door is pivotally mounted to said body to pivot between a first position closing the opening and a second position spaced from the opening; and
spring means are provided extending between said body and said door to bias the door towards the first position.

10. The master shield of claim 9, further characterized in that said door is pivotally mounted about at least one pivot pin and said body also is pivotally mounted about said at least one pin.

11. The master shield of claim 10, further characterized in that each side of the body has a pivot slot formed therein and the pivot pins extended at least into the pivot slots to pivotally mount the body.

12. The master shield of claim 11, further characterized in that the body has a normal operational position wherein the pivot pins are positioned at a first end of the pivot slots and a raised position wherein the pivot pins are positioned at the second end of the pivot slots.

13. The master shield of claim 12, further characterized in that the door has lift extensions which are engageable with ends of corresponding lift slots formed in the body when the body is in its second position such that pivoting of the door will cause the lift extension to move the body from its second position towards its first position.

14. The master shield of claim 13, further characterized in that the lift extensions are on the other side of the pivot pins from the part of the door which closes the body opening.

15. The master shield of claim 14, further characterized in that the spring means comprises at least one tension spring extending between a spring extension on the door and a spring flange on the body.

16. The master shield of claim 15, further characterized in that the spring extension, the spring flange and the pivot slots are arranged to form an over-center configuration such that the spring reaches its maximum extension when the body is moved between its first and second positions.

17. The master shield of claim 16, further characterized in that the shield is mounted to a vehicle having a 3-point hitch and a power take-off shaft about which said shield is positioned, said body opening and door being sized and positioned such that the center link of the hitch can engage the door but not the body.

* * * * *